Patented Oct. 30, 1945

2,388,225

UNITED STATES PATENT OFFICE 2,388,225

PROCESS FOR POLYMERIZING OLEFINIC MATERIALS

Richard E. Brooks, Wilmington, Merlin D. Peterson, Edgemoor Terrace, and Arthur G. Weber, Wilmington, Del., assignors to E. I. du Pont de Nemours & Company, Wilmington, Del., a corporation of Delaware No Drawing. Application March 15, 1941, Serial No. 383,546

18 Claims. (Cl. 260—86)

This invention relates to polymerization processes and more particularly to polymerization processes involving ethylene, either alone or together with other polymerizable materials.

Various proposals have been made for the polymerization of ethylene to solid or semi-solid polymers such, for example, as in U. S. 2,153,553 and 2,188,465, wherein ethylene is subjected to elevated pressures and temperatures in the presence of polymerization-promoting catalysts.

Among the problems in the polymerization of ethylene, however, has been the undesired extent of the induction period before polymerization begins. This problem is of considerable importance in economical operation, because extended induction periods favor adverse effects upon the final product, resulting in products of lower viscosity and lower yields than in those processes where polymerization starts relatively quickly.

It is an object of this invention to provide a new and improved process for ethylene polymerization.

It is another object of this invention to provide a method for lessening the induction period, and as well, for increasing the rate of reaction in polymerizations involving ethylene.

Other objects and advantages of this invention will be apparent in the following specification.

According to this invention ethylene, alone or in admixture with at least one other polymerizable organic compound, may be polymerized in a manner which gives advantages over the prior art by carrying on the polymerization at elevated pressures and temperatures in the presence of water and a specific catalyst combination, i. e. in the presence of an alkali metal persulfate together with a reagent which will ensure the reaction being carried on at a pH in the range of from 7 to 11. Of the alkali metal persulfates which may be employed, sodium and potassium have been found to give the best results, and of these two, sodium persulfate is preferred. Any of the recognized reagents for maintaining the pH may be used alone, or in mixture, such as borax, sodium bicarbonate, potassium bicarbonate, sodium phosphate and the like; of these materials, borax is preferred.

The quantities of persulfate employed may be from 0.001% to 1.0% or higher but preferably are of the order of 0.01% to 0.6%, based upon the water in the presence of which the polymerization is carried on. Similarly, the quantity of reagent or buffering agent or mixture employed may be varied over a fairly wide range such as from 0.01% to 10.0% but preferably the quantity of buffer should be from 0.10% to 1.0% based upon the water.

The pH conditions under which the process of the present invention is carried out have a critical effect, the persulfate catalyst being most effective in the pH range of 7 to about 11, outside of which range no practical yields of polymer are obtained.

The final products obtained by effecting polymerization with the catalysts and in the pH ranges of this invention are in a semi-dispersed form in contrast with the products obtained by the use of other catalysts such as an organic peroxide catalyst and are free from the phenomenon of building into agglomerates so that the final products may be readily removed from the reaction vessel and recovered in greater yields than previously found possible.

Although best results are obtained by the use of the catalysts of this invention at the pH ranges indicated, good results may also be obtained when using persulfates with other catalysts, such as peroxide catalysts, e. g. benzoyl peroxide, if the pH range is adjusted to from 7 to about 11. When combined with other catalysts, as above indicated, the lessening of the induction period and speeding up of the rate of reaction, as well as the improvement in the form of the final product are, as might be expected, intermediate when compared with the use of peroxide or other catalysts alone and the use of persulfates alone.

The range of temperatures within which this invention may be practiced is wide, temperatures of from 40 to 350° C. covering the preferred field of operation, although best results are obtained when the temperature is maintained in the more restricted range of from about 60 to 250° C. In making polymers of ethylene with other polymerizable materials, the particular temperatures used are affected by the polymerizing characteristics of the other components of the interpolymer, but, as a rule, the preferred temperature ranges previously described may be employed advantageously.

The particular pressure used in any case depends upon the polymerizing characteristics of the reactants and pressures in excess of 50 atmospheres and up to 3,000 atmospheres and above may be employed, although, preferably, pressures of 300 to 1500 atmospheres are commonly used. Actually, the upper pressure which may be employed is restricted primarily by the mechanical strength of commercially available equipment.

In one method of practicing the invention, a suitable vessel is charged either with water or water with an organic liquid, a persulfate catalyst, together with a suitable pH controlling agent, e. g. borax, and, if desired, a surface active agent. The vessel is then closed, charged with ethylene to the desired pressure, agitation started, and the temperature adjusted to that at which it is desired to carry out the reaction. The pressure on the system is maintained by the periodic additions of ethylene and after the desired reaction has occurred the reaction vessel is opened, the polymer removed and thoroughly washed and dried.

The following examples will illustrate methods of practicing this invention. Parts are by weight unless otherwise stated. Unless otherwise specifically stated, the pH is between 7 and 11.

Example 1

Into a stainless steel vessel of about 400 cc. there was charged 150 grams of distilled water, 0.5 gram of sodium persulfate, 9 grams of a 32% water solution of the sodium salts of sulfonates of 16 carbon atom hydrocarbons, and 3 grams of borax.

The tube was closed, placed in a shaking machine, evacuated, flushed with ethylene to remove air, and agitation started.

After evacuation, ethylene containing less than 5 P. P. M. oxygen was then introduced to a pressure of about 600 atmospheres at room temperature. The reaction vessel was then heated at 59–68° C. for 9½ hours with a resultant pressure of 900–1025 atmospheres. This pressure was maintained by periodic addition of ethylene. A pressure drop of 525 atmospheres was observed during the reaction period.

At the expiration of this reaction period 35 grams of solid ethylene polymer was removed. This material was polymerized to such a high degree that its low solubility made it impractical to measure its intrinsic viscosity. From the final product tough films could be hot-pressed and strong filaments could be extruded.

Example 2

Into a vessel such as described in Example 1 there was charged 150 cc. of distilled water, 0.5 gram sodium persulfate, 9 grams of a 32% water solution of sodium salts of sulfonates of 16 carbon atom hydrocarbons, 3 grams of borax and 30 grams of vinyl acetate. The method of Example 1 was followed and ethylene containing about 150 P. P. M. was introduced to a pressure of about 500 atmospheres at room temperature. The reaction vessel was then heated at 70–120° C. for 11 hours at a pressure of 900–1010 atmospheres.

At the expiration of this period 6 grams of an ethylene polymer containing about 50 parts vinyl acetate was obtained. In this example as well as in the example preceding there was no induction period, the reaction starting immediately.

Example 3

Into a vessel such as described in Example 1 was charged 150 cc. of distilled water, 0.5 gram of sodium persulfate, and 5 grams of sodium bicarbonate. The tube was closed, placed in a shaking machine, evacuated, flushed with ethylene to remove air and agitation started.

Ethylene containing less than 5 P. P. M. of oxygen was then introduced to a pressure of about 500 atmospheres at room temperature.

The reaction vessel was then heated at 70 to 124° C. for 12 hours with a resultant pressure of 870–980 atmospheres. At the expiration of this period 23 grams of polymer was removed which was too slowly and incompletely soluble in ordinary solvents for determination of its intrinsic viscosity. The product was a solid from which tough films could be hot-pressed and from which strong filaments could be extruded. The reaction started immediately upon application of the reaction conditions and there was no induction period.

Example 4

Into a vessel such as described in Example 1 was charged 150 cc. of distilled water, 0.3 gram of potassium persulfate, and 5 grams of potassium bicarbonate. The tube was closed, placed in a shaking machine, evacuated, flushed with ethylene to remove air and agitation started.

Ethylene containing about 5 P. P. M. of oxygen was then introduced to a pressure of about 500 atmospheres at room temperature.

The reaction vessel was then heated at 70 to 100° C. for 10 hours with a resultant pressure of 800–1000 atmospheres. At the expiration of this period 18 grams of polymer was removed which was too slowly and incompletely soluble in ordinary solvents for determination of its intrinsic viscosity. The product was a solid from which tough films could be hot-pressed and from which strong filaments could be extruded. The reaction started immediately upon application of the reaction conditions and there was no induction period.

Example 5

Into a reaction vessel such as described in Example 1 was charged 150 cc. of distilled water, 0.5 gram sodium persulfate, 30 grams vinyl chloride, and 3 grams of sodium carbonate. The vessel was closed, placed in a shaking machine, evacuated, flushed with ethylene to remove air and agitation started. Ethylene containing about 5 P. P. M. of oxygen was then introduced to a pressure of about 600 atmospheres at room temperature. The reaction vessel was then heated at 75–77° C. for 8 hours with a resultant pressure of 900–1000 atmospheres. A pressure drop of 325 atmospheres was observed during the reaction period. At the expiration of the reaction period 54 grams of solid polymer was removed which was too slowly and incompletely soluble in ordinary solvents for determination of its intrinsic viscosity. The reaction started immediately upon application of the reaction conditions and there was no induction period.

Example 6

Into a reaction vessel such as described in Example 1 and following the operating technique described in this example, there was charged 150 cc. of distilled water, 9 cc. of 32% water solution of the sodium salts of sulfonates of 16 carbon atom hydrocarbons, 0.5 gram of sodium persulfate, 3 cc. of 85% phosphoric acid and enough NaOH solution to give a pH of 9, and 30 grams of vinyl chloride. The vessel was closed, placed in a shaking machine, evacuated, flushed with ethylene to remove air and agitation started.

Ethylene containing about 5 P. P. M. of oxygen was then introduced, and the reaction vessel was then heated at 64–75° C. for 12 hours at a resultant pressure of 900–1000 atmospheres. A pressure drop of 735 atmospheres was observed during the reaction period. At the expiration of the reaction, 54 grams of polymer were obtained which analyzed 36% vinyl chloride and which product had an intrinsic viscosity of greater than 1. There was no induction period and the pressure was maintained by the periodic additions of ethylene.

The reaction is preferably carried out in water alone as the menstruum. If desired, however, a small amount of an organic compound, and preferably a volatile organic liquid compound such as isooctane, toluene, butyl acetate, ethyl ether, n-hexane, cyclohexane, cyclohexanone, butanol, methanol, dioxane, etc., may be used in conjunction with water.

In commercial practice a continuous process offers advantages of efficiency, more accurate control, and especially in the case of interpolymers better possibilities for adjusting the ratio of interpolymerizing ingredients. For most efficient operation in a continuous process a rapid rate of reaction is desirable.

The essential conditions for the present invention may be used in a continuous process as well as in a batch process and may be varied widely. For example, ethylene under pressure may be mixed continuously with water containing a persulfate and a pH controlling agent and the mixture, maintained in a turbulent state, passed under pressure through a reactor in which the time of contact and temperature are controlled, to effect the required degree of polymerization. The resulting suspension of polymer may then pass into an area of lower pressure to recover unreacted ethylene and the polymer isolated by filtration. When polymerizing ethylene with a liquid unsaturated compound the latter can be introduced continuously as a mixture with the water phase. When it is desired to polymerize continuously two unsaturated gases, both having critical temperatures below the operating temperature, e. g. ethylene and tetrafluoroethylene, the gases may be premixed in the desired proportions and brought into contact with the water phase under pressure or the gases may be injected separately into the water phase in the desired proportions.

For rapid polymerization it is necessary to provide intimate contact between all the reactants by agitation. By the term agitation as used herein it is intended to include any means for accomplishing intimate contact between the reactants, e. g. rapid stirring, turbulence in a continuous flow process, atomization, shaking, or efficient bubbling of the gas or gases through the water phase.

The term polymer as used in the claims refers to products obtainable by polymerizing ethylene alone or admixed with one or more other polymerizable organic compounds such as: other monoolefines, e. g. amylene, butylene; dichloroethylenes, e. g., 1,2-dichloroethylene, 2-chloropropene-1; tetrafluoroethylene; vinyl ethers, ketones and esters and other vinyl compounds, such as methyl and propyl vinyl ethers, methyl and ethyl vinyl ketones, vinyl chloroacetate, vinyl propionate, N-vinyl phthalimide, vinyl thiol acetate, methyl vinyl thioether, sulfone, vinyl sulfonic esters, vinyl carbazole; stilbene; styrene; acrylic and methacrylic acids and their amides, nitriles and esters and other acrylic and methacrylic compounds, such as the methyl, ethyl and propyl acrylates and methacrylates, methylene diacrylate and dimethacrylate, alpha-haloacrylic acids and esters, e. g., methyl alpha-chloroacrylate; esters of crotonic acid, e. g. methyl crotonate; and esters of itaconic acids, e. g., diethyl itaconate.

By the process of this invention copolymers can also be made, by which term is meant the products obtainable by the polymerization of ethylene with one or more polymeric materials resulting from the polymerization of organic compounds of the above mentioned types.

In the preparation of polymers the process of this invention is particularly advantageous not only with respect to breadth of applicability but also with respect to uniformity of the products and ease of operation. Thus by the process of this invention polymers of ethylene with other materials can be made which are not readily prepared by the prior art methods either because of lack of stability of the other component or components of the polymer under the operating conditions or because under the operating conditions intimate contact of the ethylene and the other component or components of the polymer is not obtained.

As many apparently widely different embodiments of this invention may be made without departing from the spirit and scope thereof, it is to be understood that we do not limit ourselves to the specific embodiments thereof except as defined in the appended claims.

We claim:

1. In a process for polymerizing ethylene, the step which comprises carrying on the polymerization reaction in an aqueous menstruum, at a pH in the range of 7-11, in the presence of an alkali persulfate polymerization catalyst in the absence of a dispersing medium and a reagent capable of maintaining the pH between 7 and about 11.

2. In a process for producing polymers of ethylene, the step which comprises carrying on the polymerization reaction in an aqueous menstruum, at a pressure above atmospheric and a temperature of at least 40° C., at a pH in the range of from 7 to about 11 and in the presence of from 0.001 to 1.0% alkali persulfate based upon the weight of the water present in the absence of a dispersing medium and a reagent capable of maintaining the pH between 7 and 11.

3. In a process for producing polymers of ethylene, the step which comprises carrying on the polymerization reaction in an aqueous menstuum, at a pressure above atmospheric and a temperature of at least 40° C., at a pH in the range of from 7 to about 11, in the presence of from 0.001 to 1% sodium persulfate based upon the weight of the water present in the absence of a dispersing medium and a reagent capable of maintaining the pH between 7 and 11.

4. In a process for producing polymers of ethylene, the step which comprises carrying on the polymerization reaction in an aqueous menstruum, at a pressure above atmospheric and a temperature of at least 40° C., at a pH in the range of from 7 to 11, in the presence of about 0.06% sodium persulfate based upon the weight of the water present in the absence of a dispersing medium and in the presence of a reagent capable of maintaining the pH between 7 and 11.

5. In a process for producing polymers of ethylene, the step which comprises carrying on the polymerization reaction in an aqueous menstruum at from 50 to 3000 atmospheres pressure and from 40 to 350° C. at a pH in the range of from 7 to 11, in the presence of an alkali persulfate polymerization catalyst in the absence of a dispersing medium and a reagent capable of maintaining the pH between 7 and 11.

6. In a process for producing polymers of ethylene, the step which comprises carrying on the polymerization reaction in an aqueous menstruum, at from 50 to 3000 atmospheres pressure and from 40 to 350° C., at a pH in the range of from 7 to 11, in the presence of an alkali metal persulfate polymerization catalyst in the absence of a dispersing medium and a reagent capable of maintaining the pH between 7 and 11.

7. In a process for producing polymers of ethylene, the step which comprises carrying on the polymerization reaction in an aqueous menstruum at from 50 to 3000 atmospheres pressure and from 40 to 350° C., at a pH in the range of from 7 to 11, in the presence of from 0.001 to 1.0% sodium persulfate based upon the weight of the water present in the absence of a dispersing medium, and a reagent capable of maintaining the pH between 7 and 11.

8. In a process for producing polymers of ethylene, the step which comprises carrying on the polymerization reaction in an aqueous menstruum at from 300 to 1500 atmospheres pressure and from 60 to 250° C., at a pH in the range of from 7 to 11, and in the presence of an alkali persulfate polymerization catalyst in the absence of a dispersing medium and borax.

9. In a process for producing polymers of ethylene, the step which comprises carrying on the polymerization reaction in an aqueous menstruum, at from 50 to 3000 atmospheres pressures and from 40 to 350° C., at a pH in the range of from 7 to 11, in the presence of about 0.06% sodium persulfate and about 0.33% borax in the absence of a dispersing medium, based upon the weight of the water present.

10. In a process for producing polymers of ethylene, the step which comprises carrying on the polymerization reaction in an aqueous menstruum at from 300 to 1500 atmospheres pressure and from 60 to 250° C., at a pH in the range of from 7 to 11 in the absence of a dispersing medium and in the presence of an alkali metal persulfate polymerization catalyst and borax.

11. In a process for producing polymers of ethylene, the step which comprises carrying on the polymerization reaction in an aqueous menstruum at from 300 to 1500 atmospheres pressure and from 60 to 250° C., at a pH in the range of from 7 to 11 in the absence of a dispersing medium, in the presence of from 0.001 to 1.0% sodium persulfate and from 0.01 to 0.6% borax, based upon the weight of the water present.

12. In a process for producing polymers of ethylene, the step which comprises carrying on the polymerization reaction in an aqueous menstruum at from 300 to 1500 atmospheres pressure and from 60 to 250° C., at a pH in the range of from 7 to 11 in the absence of a dispersing medium, in the presence of about 0.06% sodium persulfate and about 0.33% borax, based upon the weight of the water present.

13. In a process for producing solid polymers of ethylene, the step which comprises carrying on the polymerization reaction in an aqueous menstruum, at a pH in the range of 7–11 in the absence of a dispersing medium, in the presence of an alkali persulfate polymerization catalyst and a reagent capable of maintaining the pH between 7 and about 11.

14. In a process for producing interpolymers of ethylene and another polymerizable organic compound, the step which comprises subjecting a mixture of ethylene and another monoethylenic polymerizable compound to a reaction at a temperature above at least 40° C. in an aqueous menstruum at a pH in the range of 7 to 11 in the absence of a dispersing medium, in the presence of an alkali persulfate polymerization catalyst and a reagent capable of maintaining the pH between 7 and about 11.

15. In a process for producing interpolymers of ethylene and vinyl acetate, the step which comprises subjecting a mixture of ethylene and vinyl acetate to a reaction at a temperature above at least 40° C. in an aqueous menstruum at a pH in the range of 7 to 11 in the absence of a dispersing medium, in the presence of an alkali persulfate polymerization catalyst and a reagent capable of maintaining the pH between 7 and about 11.

16. In a process for polymerizing ethylene, the steps which consist in carrying on the polymerization reaction in an aqueous menstruum, at a pH in the range of 7 to 11, in the presence of an alkali persulfate polymerization catalyst and a reagent capable of maintaining the pH between 7 and about 11.

17. In a process for polymerizing ethylene, the step which consists in carrying on the polymerization reaction in an aqueous menstruum at from 300 to 1500 atmospheres pressure and from 60 to 250° C. at a pH in the range of from 7 to 11, and in the presence of an alkali persulfate polymerization catalyst and borax.

18. In a process for producing solid polymers of ethylene, the step which consists in carrying on the polymerization reaction in an aqueous menstruum, at a pH in the range of 7 to 11, in the presence of sodium persulfate as the polymerization catalyst and a reagent capable of maintaining the pH between 7 and about 11.

RICHARD E. BROOKS.
MERLIN D. PETERSON.
ARTHUR G. WEBER.